(12) United States Patent
Hashimoto et al.

(10) Patent No.: US 7,167,958 B2
(45) Date of Patent: Jan. 23, 2007

(54) SECOND STORAGE SYSTEM EQUIPPED WITH SECURITY SYSTEM AND A METHOD OF CONTROLLING THE SECOND STORAGE SYSTEM

(75) Inventors: Akiyoshi Hashimoto, Tokorozawa (JP); Tetsuya Uemura, Sayama (JP)

(73) Assignee: Hitachi, Ltd., Tokyo (JP)

( * ) Notice: Subject to any disclaimer, the term of this patent is extended or adjusted under 35 U.S.C. 154(b) by 733 days.

(21) Appl. No.: 10/084,910

(22) Filed: Mar. 1, 2002

(65) Prior Publication Data

US 2003/0131261 A1 Jul. 10, 2003

(30) Foreign Application Priority Data

Jan. 10, 2002 (JP) .............................. 2002-002935

(51) Int. Cl.
G06F 12/00 (2006.01)
G06F 13/00 (2006.01)
G06F 13/28 (2006.01)

(52) U.S. Cl. .................. 711/152; 711/153; 711/154; 711/114

(58) Field of Classification Search ................ 713/201; 711/152–154, 163–164, 114; 709/223, 229
See application file for complete search history.

(56) References Cited

U.S. PATENT DOCUMENTS

| | | | |
|---|---|---|---|
| 6,343,324 B1 * | 1/2002 | Hubis et al. ................. | 709/229 |
| 6,606,695 B2 | 8/2003 | Kamano et al. | |
| 6,671,776 B1 * | 12/2003 | DeKoning ................... | 711/114 |
| 6,779,083 B2 * | 8/2004 | Ito et al. ....................... | 711/114 |
| 6,907,496 B2 * | 6/2005 | Langford et al. ........... | 711/103 |
| 6,907,498 B2 * | 6/2005 | Kitamura et al. ........... | 711/112 |
| 2001/0008010 A1 * | 7/2001 | Sanada et al. ............... | 711/152 |
| 2002/0007445 A1 * | 1/2002 | Blumenau et al. .......... | 711/153 |
| 2003/0005218 A1 | 1/2003 | Takano | |
| 2003/0093509 A1 * | 5/2003 | Li et al. ....................... | 709/223 |

FOREIGN PATENT DOCUMENTS

| | | |
|---|---|---|
| JP | 10-333839 | 12/1998 |
| JP | 2000-347808 | 12/2000 |
| JP | 2001-249769 | 9/2001 |
| JP | 2002-244941 | 8/2002 |

OTHER PUBLICATIONS

The Fibre Channel Industry Association Japan; URL: http://www.fibrechannel.org/.

* cited by examiner

Primary Examiner—Christopher Revak
Assistant Examiner—Arezoo Sherkat
(74) Attorney, Agent, or Firm—Mattingly, Stanger, Malur & Brundidge, P.C.

(57) ABSTRACT

A second storage conventionally authenticates a host computer, but this is weak in a disguise attack. Further, since there is provided only an option of two ways: connection authorization and connection rejection, an intrusion into the host computer directly leads to destruction of data in the second storage. Therefore, a plurality of network transportation ports are provided and connected to different networks, respectively, and an access right to data in a second storage is specified for the transportation port. Furthermore, it can be specified whether or not the access for each I/O command is authorized.

19 Claims, 8 Drawing Sheets

FIG. 2

| | LOGICAL DISK 0 | LOGICAL DISK 1 | ......... | LOGICAL DISK (n−1) |
|---|---|---|---|---|
| NETWORK PORT 0 | READ ENABLE WRITE ENABLE | READ ENABLE WRITE ENABLE | ......... | — |
| NETWORK PORT 1 | READ ENABLE | — | ......... | READ ENABLE WRITE ENABLE |

EXAMPLE
READ ENABLE : READ ONLY ENABLE
WRITE ENABLE : WRITE ONLY ENABLE

FIG. 6

| | LOGICAL DISK 0 | LOGICAL DISK 1 | LOGICAL DISK 2 | LOGICAL DISK 3 | LOGICAL DISK 4 |
|---|---|---|---|---|---|
| NETWORK PORT 0 | READ ENABLE WRITE ENABLE | READ ENABLE WRITE ENABLE | READ ENABLE | — | READ ENABLE WRITE ENABLE |
| NETWORK PORT 1 | — | READ ENABLE | READ ENABLE WRITE ENABLE | READ ENABLE WRITE ENABLE | READ ENABLE WRITE ENABLE |

EXAMPLE
READ ENABLE : READ ONLY ENABLE
WRITE ENABLE : WRITE ONLY ENABLE
— : NOT DETECTED BY HOST

EXAMPLE
READ ENABLE : READ ONLY ENABLE
WRITE ENABLE : WRITE ONLY ENABLE
— : NOT DETECTED BY HOST

SECOND STORAGE SYSTEM EQUIPPED WITH SECURITY SYSTEM AND A METHOD OF CONTROLLING THE SECOND STORAGE SYSTEM

BACKGROUND OF THE INVENTION

1. Field of the Invention

The present invention relates to holding the security of data in a second storage (second storage system) connected to a network.

2. Description of Related Prior Art

In recent years, a second storage represented by a second storage system has been oriented to a network, and many universities or enterprises are developing such a technology that the second storage is directly connected to the network such as LAN (Local Area Network), or the like.

When the second storage is directly connected to the network, there is a possibility that an unspecified number of host computers access the second storage. Accordingly, it is required to assure the security of data between the network and the second storage, that is, any security system is required for the second storage.

In Japanese Patent Laid-Open No. 10-333839 (hereinafter referred to as known example 1), an example of the second storage equipped with a security system is disclosed.

In the security system of known example 1, an administrator authenticates the host computer to be accessed to the second storage by using an identifier (world wide name in known example 1) then registers it. Specifically, the host computer transmits the worldwide name to a second storage side on request for connection to the second storage. When the transmitted world wide name is registered one, the security system of the second storage authorizes the host computer and allows it to be connected to the second storage. When it is not registered one, the system of the second storage makes a connection reject response.

However, when a system of known example 1 is applied to an unspecified number of host computers present in the network, a registration work is enormous and the administrator's load is highly increased. Accordingly, it is realistically difficult that the system of known example 1 is applied to a second storage directly connected to a network.

Further, there is a possibility that the identifier to be registered is forged. Additionally, when the host computer having a due authorization with respect to the second storage (namely, having the registered identifier) has permitted an intrusion, tampering with data cannot be prevented. The reason is that the intruded host computer has the due authorization with respect to the second storage.

Such a configuration is not conventionally general that an unspecified number of host computers are connected to the second storage, and since the host computer provided a security such as user authentication, a conventional second storage could not prevent destruction or leakage of data in the second storage due to illegal intrusion from the host computer. For example, such an event occurred early in 2000 that an intruder who illegally obtained an administrator's authorization forged a web page file in the second storage of a web server of the Japanese Government. Since the administrator has a due authorization, it is impossible at the second storage side to stop illegal intrusion of the second storage from a host computer side.

A firewall protects the second storage against a disguise to a certain degree by. The firewalls have three network transportation ports for connecting with the Internet, for connecting with the Intranet and for connecting with a demilitarized zone, respectively. Here, the demilitarized zone means a region where the host computer only for accepting access from the Internet is placed. The probability of the illegal intrusion increases when the host computer in the Intranet directly accepts the access from the Internet. The demilitarized zone is therefore provided to protect the host computer in the Internet against such intrusion.

The firewall determines passage or non-passage of a packet which passes a transportation port according to rules made by the administrator. For example, the firewall compares a source IP address in the packet passing the transportation port and the network transportation port which the packet enters. When the packet enters the port from a side of the Internet, the firewall does not pass the packet even if the source IP address is an address in the Intranet. The reason is that there is every possibility that the IP address has been forged. Since the firewall limits access from external devices to the demilitarized zone, there becomes little probability of the intrusion into the Intranet where important data is present.

As described above, in the system in known example 1, it would be difficult to prevent the unauthorized intruder who obtained the authorization of the host computer from intruding into the second storage. This is caused in known example 1 by a point that the access is controlled by transmission information from the host computer and a point that there is only a choice of two ways: connection authorization and connection rejection. There is some possibility of forgery in the transmission information from the host computer. Since there is only the choice of two ways: the connection authorization and connection rejection, if the connection has once been authorized, this leads to authorization of any work.

Furthermore, since the firewall makes only a judgment of the passage or non-passage of the packet, the firewall cannot make elaborate protections in compliance with access classes with respect to the second storage. The directly network-connected second storage is connected to an unspecified number of host computers. As the connected host computers increase, the judgment rules of the passage or non-passage of the packet become complicated. Accordingly, the firewall is not a proper protection method in terms of data protection for the directly network-connected second storage.

BRIEF SUMMARY OF THE INVENTION

Therefore, it is an object of the present invention to provide a security protection method proper for the directly network-connected second storage.

According to the present invention, the second storage has a plurality of network transportation ports, which are connected to different networks, respectively. The judgment of the connection authorization or non-authorization on access request is carried out in access class units as I/O commands (for example, read and write) to data in the second storage, and this judgment is carried out in each network transportation port.

The authorization or non-authorization is specified in access class units such as read or write on the access request for the network transportation port. Data is therefore not tampered even if the illegal intrusion is made into the host computer. Additionally, since the authorization or non-authorization is judged based on a physical configuration of the network, a disguise attack is not acceptable thereon. Furthermore, the host computer is not identified, but the network to which the host computer belongs is identified, so that the authorization or non-authorization is judged. Therefore, the operation burden on the administrator is largely reduced.

BRIEF DESCRIPTION OF THE SEVERAL VIEWS OF DRAWING

FIG. 2 is a form of an access controlling table according to the present invention;

FIG. 6 shows the contents of the access controlling table according to the second embodiment of the present invention;

DETAILED DESCRIPTION OF THE INVENTION

Hereinafter, embodiments of the present invention will be explained with reference to the drawings.

Embodiment 1

Figure 1:
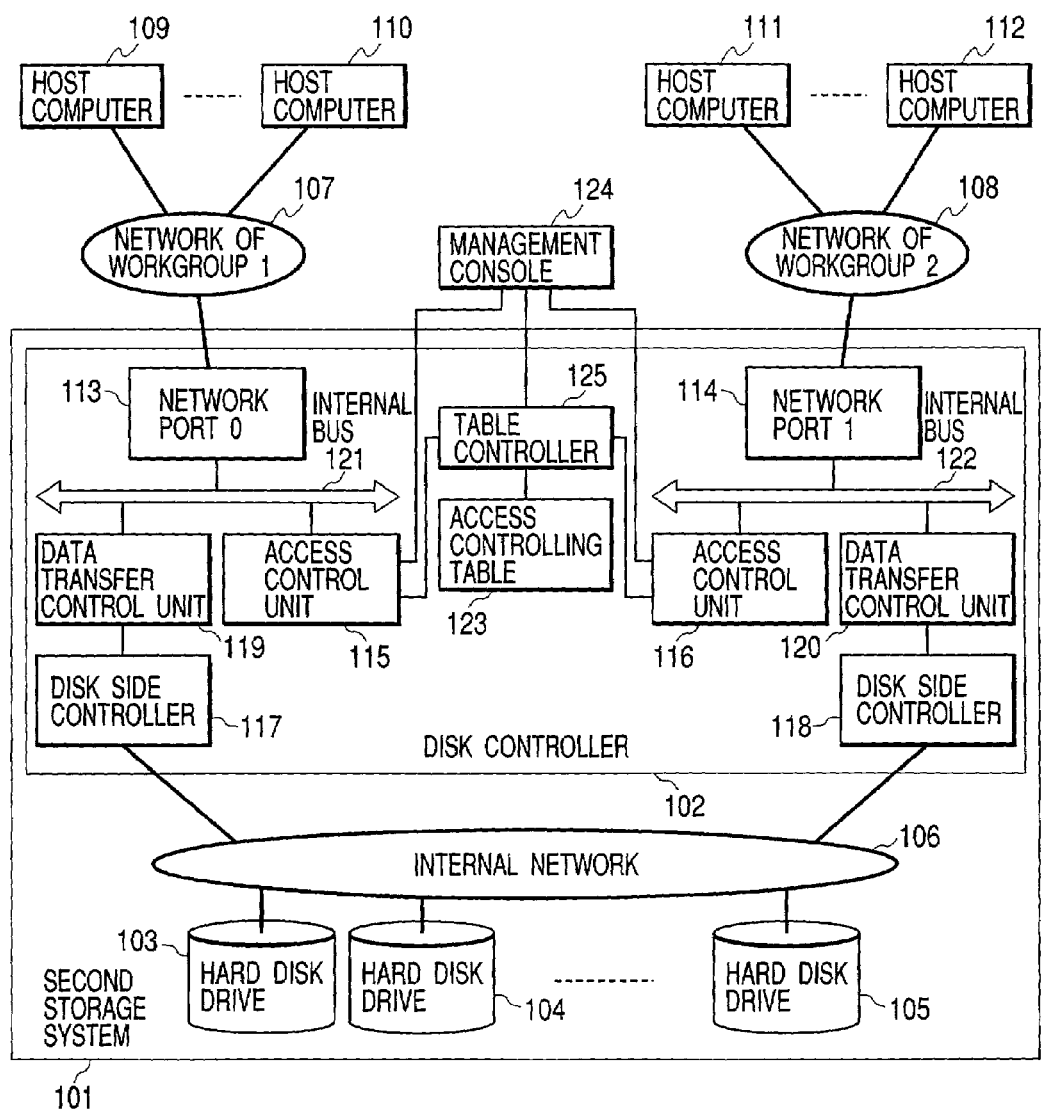
FIG. 1 is an overall configurational diagram according to a first embodiment of the present invention.

A configuration example of the present invention is shown in FIG. 1. In this embodiment, the embodiment of the present invention will be explained by use of a second storage system as a second storage. A second storage system 101 comprises a disk controller 102, hard disk drives 103, 104, and 105 for actually storing data, an internal network of working group 106 for connecting the disk controller 102 with the hard disk drives 103, 104, and 105. In FIG. 1, the internal network has a circular form, but the present invention does not depend on the form of the internal network.

The second storage system 101 is connected to a network of working group 1 (107) and a network of working group 2 (108). The network of working group 1 (107) is connected to host computers 109, 110, and a network of working group 108 is connected to host computers 111, 112. The above network is a control unit assumed by an IP (Internet Protocol) technology. Various enterprises and organizations take part in WAN (Wide Area Network) represented by the Internet. Also in the enterprises and organizations, the network is internally laid, and the WAN has a hierarchical structure. One unit of this hierarchical structure is the network in this embodiment. A junction point is always present at one location between the different networks. A device for relaying a transmission at this junction point is called a gateway or a router. The gateway has to be passed in the transmission between the different networks, but the firewall is simultaneously installed in the gateway, so that illegal intrusion is difficult.

The disk controller 102 receives and interprets I/O commands requested by the host computers 109 to 112, and converts them into a proper form, to issue to the hard disk drives 103 to 105. A network port 0 (113) and a network port 1 (114) communicate with host computers 109 to 112 via networks of working groups 1 or 2. Access controllers 115 and 116 interpret and execute I/O requests transmitted by host computers 109 to 112. Disk side network controllers 117 and 118 control communication with hard disk drives 103 to 105 via the internal network of working group 106. When data generated in an I/O process is transmitted, data transfer control units 119 and 120 transfer data between the network port 0 (113), the network port 1 (114) and the disk side network controllers 117 and 118. Internal buses 121, 122 interconnect the network port 0 (113), the network port 1 (114), the access controllers 115 and 116 and the data transfer control units 119 and 120. An access controlling table 123 stores access authorization setting information on data stored in the hard disk drives 103 to 105. A management console 124 is used for an information display for an administrator to maintain and control the second storage system 101 and to send/receive a maintenance request. The management console 124 is provided with a screen (not shown) for the information display and an I/O device (not shown) such as a keyboard for accepting a request from the administrator. Further, the management console 124 is physically integrated with the second storage system 101, and the operator cannot perform operations which have important influences on the system such as a configuration change, power-off, and power-on unless he or she stands in front of the system. The reason is that to stand in front of the system is the hardest obstacle to an intruder. A table controller 125 communicates with the management console to display contents of the access controlling table 123 to the management console, or to change them. In FIG. 1, the second storage system has two network ports, but the present invention does not depend on the number of the network ports.

FIG. 2 shows a form and a setting example of the access controlling table 123. An access authorization setting in each logical disk is described in columns of a logical disk 0 (201), a logical disk 1 (202) and a logical disk (n-1) (203). Here, the logical disk means a magnetic disk which the disk controller 102 has virtually realized with respect to the host computers 109 to 112. The logical disk may coincide with the hard disk drives 103 to 105, or may not coincide therewith. The logical disk is advantageous in that a capacity can be set without depending on a storage capacity of the actually mounted hard disk drive, so that a degree of freedom in a control aspect increases. I/O commands in which access from the network port 0 (113) is authorized for each logical disk are described in a row of a network port 0 204. A field of a network port 1 205 is also same. In this manner, the I/O commands authorized from the network port for the logical disk are described in each field of the access controlling table 123. Three types of "READ enable," "WRITE enable" and "-" can be described in those fields. "READ enable" is a READ only enable, and "WRITE enable" is a WRITE only enable, and "-" is to be not recognized by the host computer connected to such network port. Since a conventional security technology controlled at a level of an authorization or non-authorization of a network connection, the above is equivalent to the effect that either "READ/WRITE enable" or "-" only can be entered into each field of the access controlling table.

In FIG. 2, the logical disk 0 indicates that access from the network port 0 is READ- and WRITE-enabled, but that the access from the network port 1 is READ-only-enabled. The logical disk 1 indicates that the access from the network port 0 is READ- and WRITE-enabled, but that the access from the network port 1 is recognition-disabled. That is, the host computers 111 and 112 connected to the network port 1 114 do not know even existence of the logical disk 1. As for the logical disk (n-1), the access from the network port 0 is a recognition disable, but that the access from the network port 1 is a READ/WRITE enable.

According to this embodiment, the authorized I/O commands are specified as "READ" and "WRITE," but this is extensible to the possible I/O commands for data. For example, in the SCSI standards as a typical standard of a second storage interface, several tens of types of I/O commands are specified, and the respective I/O commands of the SCSI standards can be described in each field of the access controlling table 123.

Further, according to this embodiment, the access authorization is set in logical disk units, but the access authorization can also be specified in control units of other data, for example, in file or record units.

Figure 3:
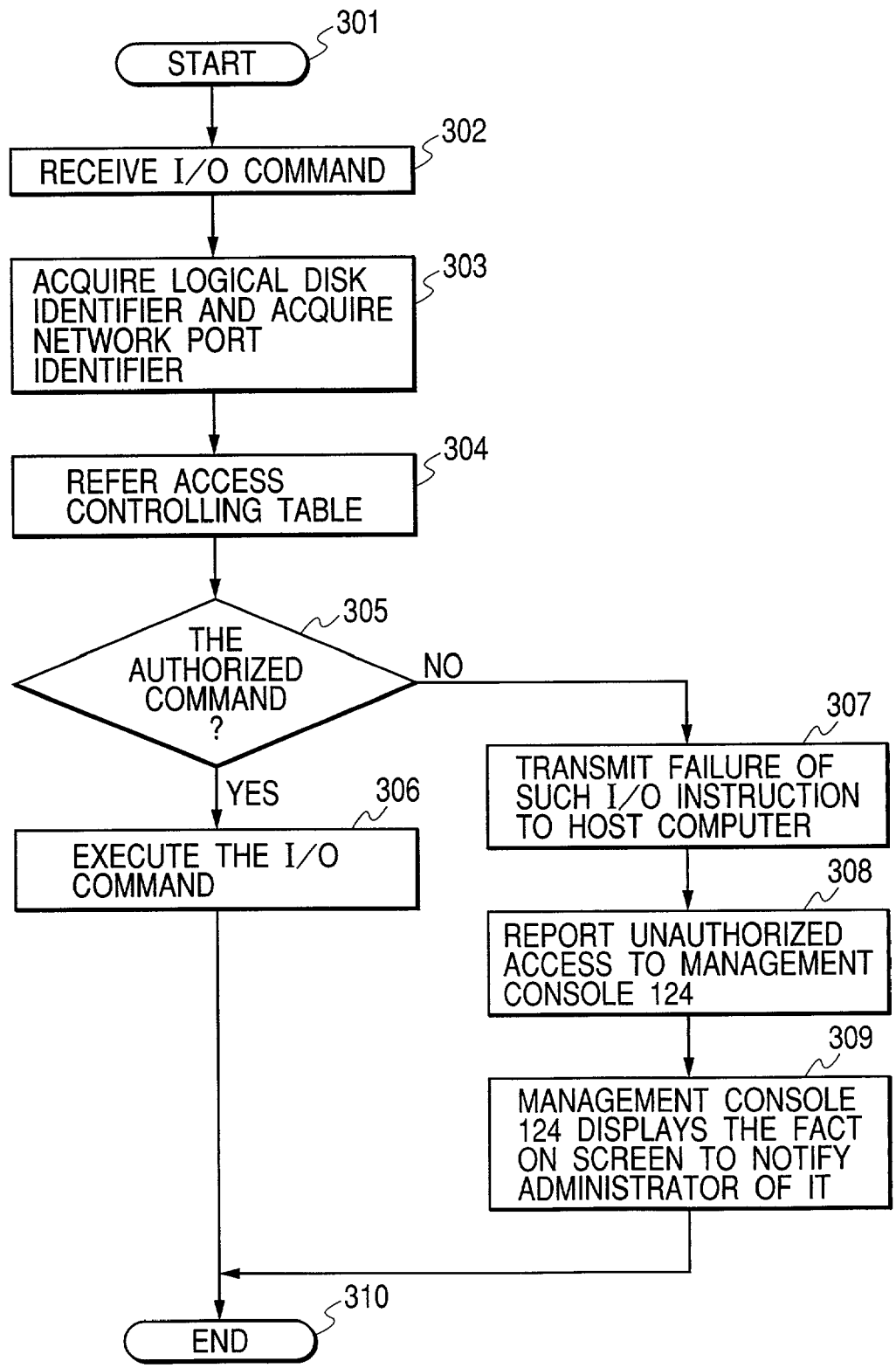
FIG. 3 is a flowchart at the time of I/O in a second storage system according to the present invention.

FIG. 3 shows a flowchart that the second storage system 101 receives and executes the I/O commands.

Step 301: Start of processing

Step 302: The I/O commands from the host computer reach the network port 113 or 114 via the network. The network port 113 or 114 transmits the I/O commands to the corresponding access controllers 115 and 116.

Step 303: The access controllers 115 and 116 extract a target logical disk number included in the I/O commands. In an I/O system to be controlled in logical disk units in this embodiment, the logical disk number is included in the I/O commands. Further, the controllers acquire an identifier of the network port the I/O commands reach.

Step 304: The access controller 115 or 116 refers to the access controlling table 123 via the table controller 125. The access controller 115 or 116 reads contents of a corresponding field of the access controlling table 123 from the logical disk number and the identifier of the network port acquired in step 303.

Step 305: The access controllers 115 and 116 read the corresponding field of the access controlling table 123, and as a result, the access controllers 115 and 116 judge whether or not such I/O command is authorized.

Step 306: If the I/O command is authorized, the access controller 115 and 116 execute the I/O command.

Step 307: If the I/O command is not authorized, the access controllers 115 and 116 notify the host computer of a failure of the I/O command. In the SCSI standards, when the I/O command is failed, the host computer occasionally issues a "REQUEST SENSE" command which requests error information of the device to the second storage system 101. The second storage system 101 may take a step of transmitting a non-authorization of such request to the host computer in response to the "REQUEST SENSE" command.

Step 308: The access controllers 115 and 116 report to the management console 124 that unauthorized access has been gained. The management console 124 records this unauthorized access event in a log file.

Step 309: The management console 124 displays on a screen the unauthorized access event to notify the administrator.

Step 310: End of the processing.

In this manner, the access can be controlled in each network port.

Figure 4:
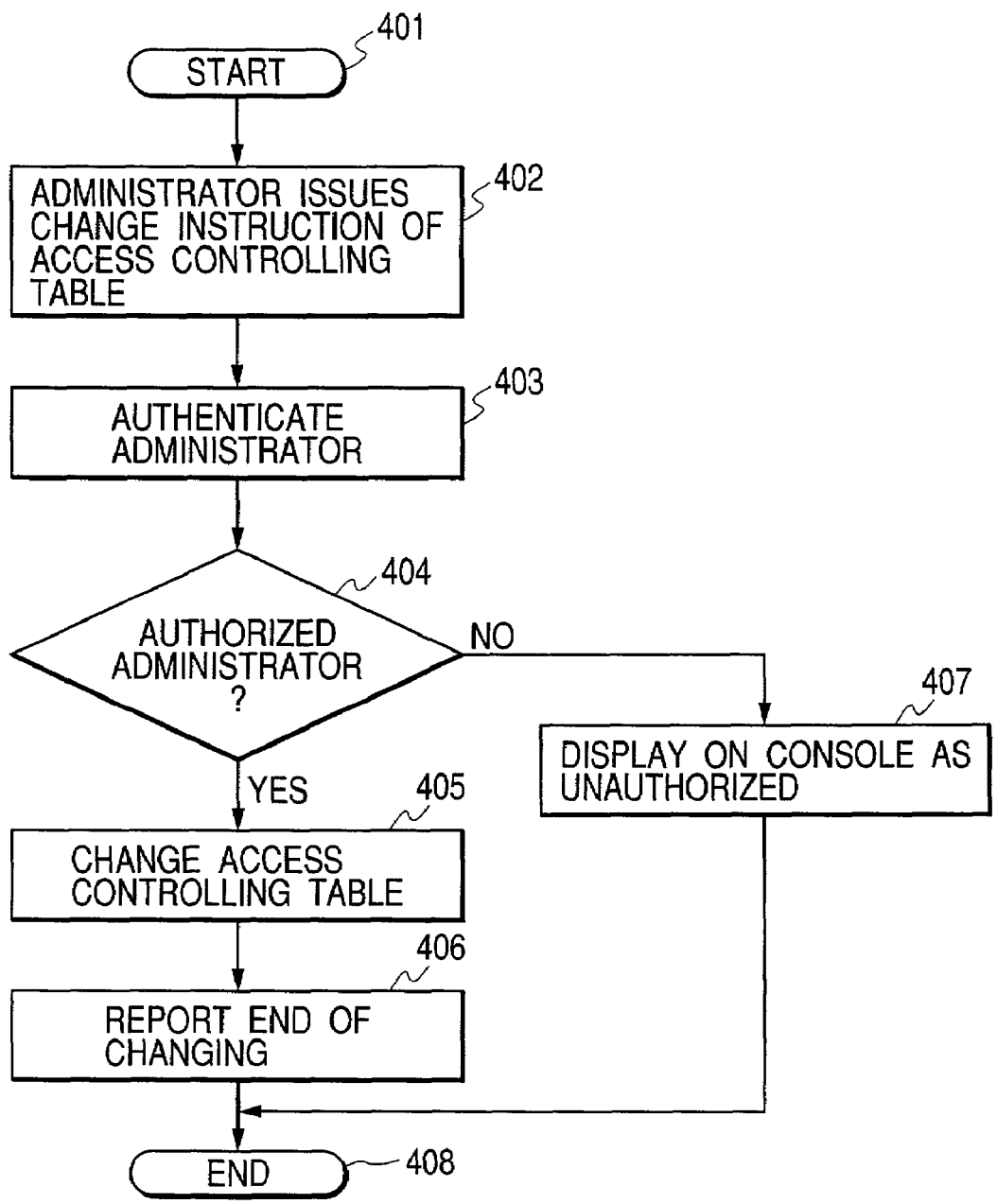
FIG. 4 is a flowchart when the access controlling table is updated and specified in the second storage system according to the present invention.

FIG. 4 shows an information setting and changing method of the access controlling table 123.

Step 401: Start of processing

Step 402: The administrator stands in front of the management console 124 of the second storage system 101, and operates the management console 124. The administrator issues a change request of the access controlling table 123.

Step 403: The management console 124 carries out an authentication work of judging whether or not a person who issued the change request in step 402 has a managerial authorization. As an authentication method, there is provided a method by a password, or a method by biometrics such as finger prints, patterns of blood vessels of a retina, patterns of veins of fingers of a hand. However, the present invention does not depend on the authentication method.

Step 404: As a result of the authentication work in step 403, it is judged whether or not the administrator has a managerial authorization.

Step 405: In the case where, as the result of the authentication work, the management console 124 recognizes that the administrator has the managerial authorization, the management console 124 issues a table change request for the table controller 125. The table controller 125 changes such region of the access controlling table 123 according to the request.

Step 406: After the change is ended, the table controller 125 reports an end of the change to the management console 124. The management console 124 displays the end of a series of operations on the screen.

Step 407: In the case where it is judged that the administrator does not have the managerial authorization in step 404, the management console 124 displays as the administrator not having the managerial authorization on if the screen. Further, a failure of the authentication is recorded in the log file. When a number of failures in the authentication occur in a short period of time, the management console takes a measure of stopping input acceptance from a person.

Step 408: End of the processing

Embodiment 2

Figure 5:
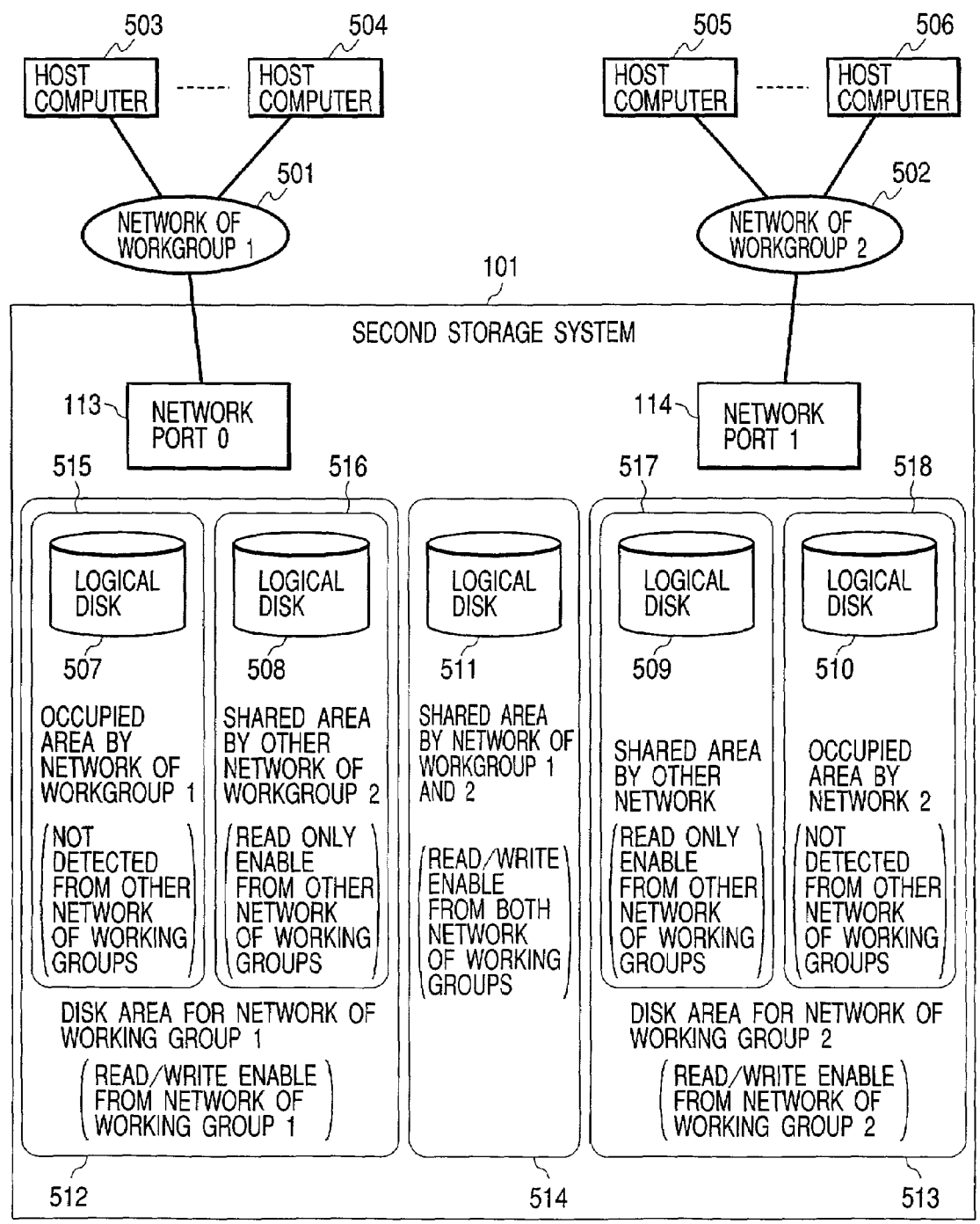
FIG. 5 is an overall configurational diagram according to a second embodiment of the present invention.

Next, a second embodiment of the present invention will be explained with reference to FIGS. 5 and 6. The second embodiment is an example in which the present invention is applied to a system of sharing the second storage system 101 between networks. When the second storage system is shared between a plurality of networks, there are three types of data consisting of data authorized to read only, data authorized to both read and write and data of which the existence is not at all recognized, with respect to the other network. If the present invention is applied thereto, it is possible to readily realize such a proper use. The second storage system 101 is connected to a network of working group 1 501 and a network of working group 2 502. The network of working group 1 501 is connected to host computers 503 and 504 to be used by a person of the network of working group 1. The network port 0 (113) is connected to the network of working group 1 501 and the network port 1 113 is connected to the network of working group 2 502. The network of working group 2 502 is connected to host computers 505 and 506 to be used by a man of the network of working group 2. The administrator allocates logical disks 0 507 to 4 511 in the second storage system 101.

The logical disk 0 507 and logical disk 1 508 are specified as a disk area 512 for the network of working group 1. They are both READ- and WRITE-enabled from the network of working group 1. The logical disk 2 509 and logical disk 3 510 are specified as a disk area 513 for the network of working group 2. They are both READ- and WRITE-enabled from the network of working group 2. A logical disk 4 512 is specified as a shared area 514 between the networks of working groups 1 and 2. That is, it is READ- and WRITE-enabled from the networks of working groups 1 and 2. Further, the disk area 512 for the network of working group 1 is divided into an area 515 occupied by the network of working group 1 and an area 516 shared by the other network. The area 515 occupied by the network of working group 1 is not recognized from the other network. The area 516 shared by the other network is READ-only enabled from the other network. The disk area 513 for the network of working group 2 is similarly divided into an area 518 occupied by the network of working group 2 and an area 517 shared by the other network.

To realize such a proper use, the access controlling table 123 is specified as shown in FIG. 6. In a field 601 of the logical disk 0, both "READ enable" and "WRITE enable" are set in a row of the network port 0 204. On the other hand, "-" is set in a row of the network port 1 205. In this manner, the logical disk 0 507 is READ- and WRITE-enabled from the network of working group 1 and recognition-disabled from the network of working group 2. In a field 602 of the logical disk 1, both "READ enable" and "WRITE enable" are set in the row of the network port 0 204. On the other hand, "READ enable" is set in the row of the network port 1 205. In this manner, the logical disk 1 508 is READ- and WRITE-enabled from the network of working group 1 and READ-only-enabled from the network of working group 2. Same applies to the logical disk 2 509 and the logical disk 3 510 belonging to the disk area 513 for the network of working group 2. In the logical disk 4 511 belonging to the shared area 514 between the network of working group 1 and network of working group 2, "READ enable" and "WRITE enable" are set in all the fields in the column of the logical disk 4 605. Such setting can create a READ- and WRITE-enabled area from both the networks. The method easily realizes the data sharing between the networks and the proper security setting.

Embodiment 3

Figure 7:
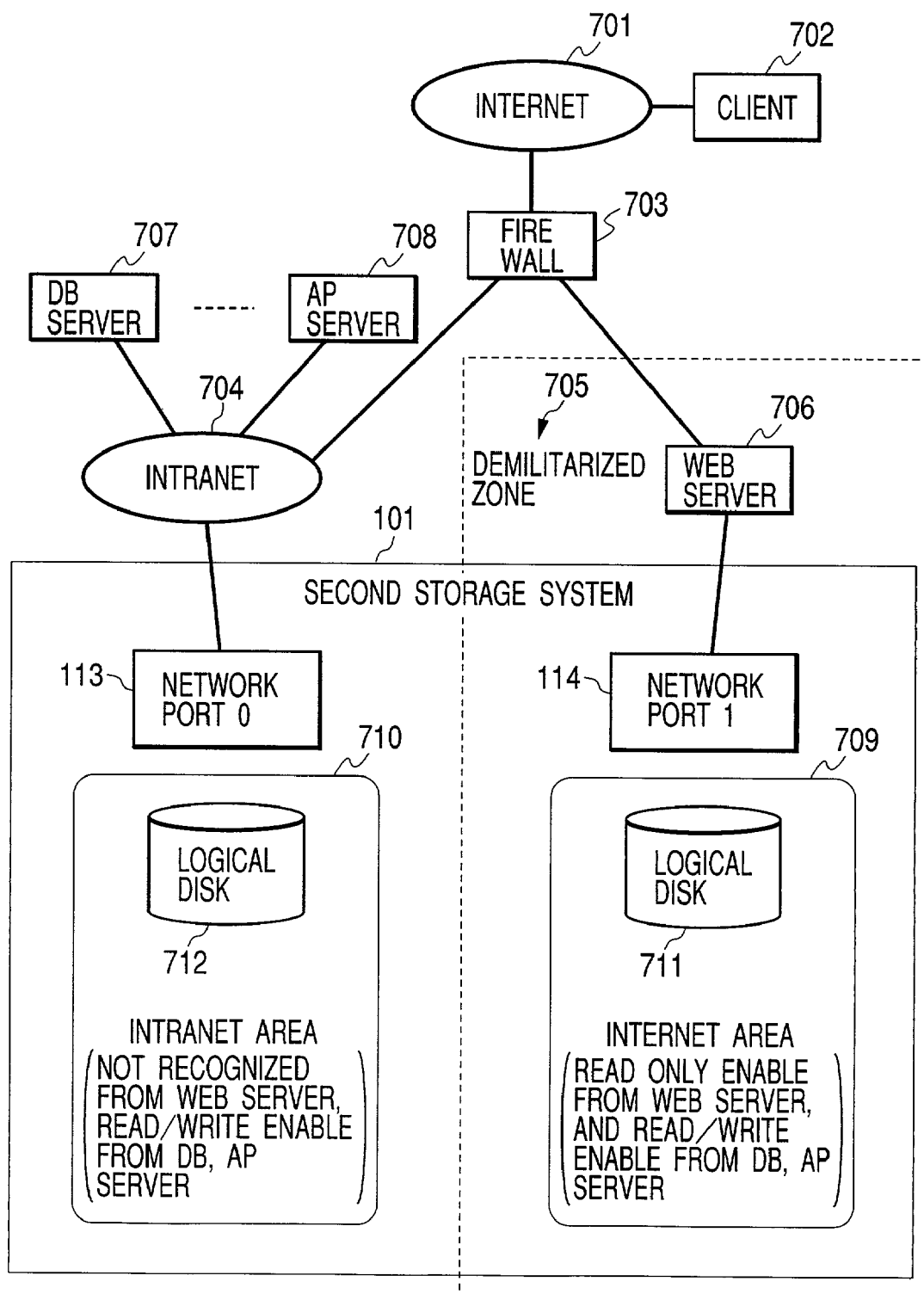
FIG. 7 is an overall configurational diagram according to a third embodiment of the present invention.
Figure 8:
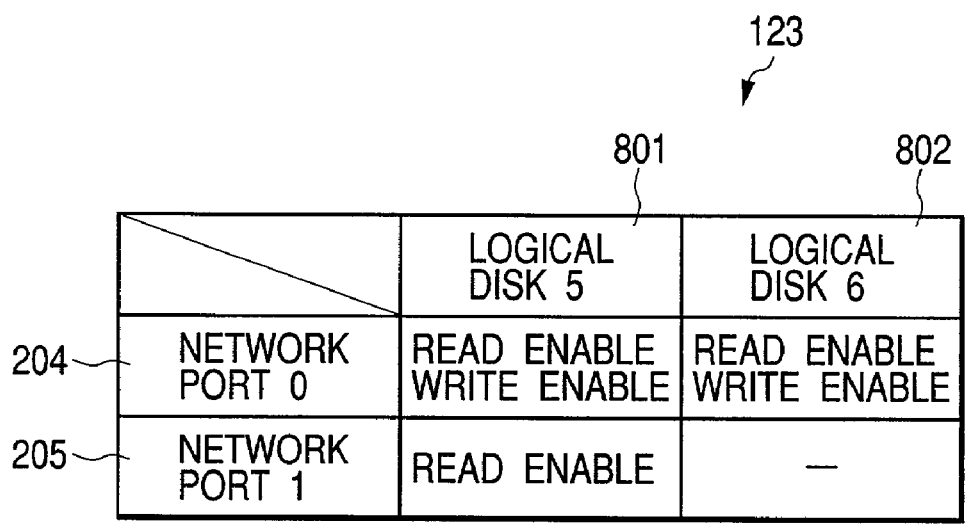
FIG. 8 shows the contents of the access controlling table according to the third embodiment of the present invention.

Next, a third embodiment of the present invention will be explained with reference to FIGS. 7 and 8. FIG. 7 shows a typical web server system. The system is connected to the Internet 701, which is connected to a client 702 using the web system. A firewall 703 is disposed at a junction point with the Internet 701 so as to relay the communication. The firewall 703 is connected to the Intranet 704 and a demilitarized zone 705. As described in Description of Related Prior Art, the demilitarized zone 705 is set for the purpose of limiting the server which accepts the access from the Internet 701 like a web server 706. The firewall 703 relays a packet which reaches from the Internet side only to a side of the demilitarized zone 705, so that the web system is realized. The Intranet 704 is connected to a DB server 707 for accessing a database in the second storage system 101, and an AP server 708 which generates a dynamic web page and presents an interactive service to the client 702. The functions of the web system which provides the interactive service in recent years, are generally assigned to the web server 706, the DB server 707 and the AP server 708.

The second storage system 101 is connected to the Intranet 704 and the web server 706. According to this embodiment, the network port 0 (113) is connected to the Intranet 704 and the network port 1 (114) is connected to the web server 706. The inside of the second storage system 101 is divided into an Internet region 709 and an Intranet region 710.

The Internet region 709 comprises a logical disk 5 711, and mainly stores files of a web page. These are only displayed for users, and to prevent tampering, it is necessary to specify the region as READ-only-enabled from a side of the web server 706. On the other hand, since a web administrator updates the web page files, it is necessary to specify the region as READ- and WRITE-enabled from a side of the Intranet 704.

The Intranet region 710 comprises a logical disk 6 712, and mainly stores a user database. These must be READ- and WRITE-enabled on the side of the Intranet 704, but are never accessed from a side of the Internet 701. Accordingly, they have to be recognition-disabled.

The present invention realizes the setting easily. FIG. 8 shows the setting of the access controlling table 123 in this embodiment. In a column 801 of the logical disk 5, both "READ enable" and "WRITE enable" are set in the field of the network port 0 204. On the other hand, only "READ enable" is set in the field of the network port 1 205. In a column 802 of the logical disk 6, "READ enable" and "WRITE enable" are set in the field of the network port 0 204, and "-" is set to the field of the network port 1 205. The setting in FIG. 8 prevents the tampering of the web page, and it can be updated from the side of the Intranet 704 as the occasion demands. The Intranet 704 need be intruded to tamper the web page; however, since a barrier like the firewall 703 exists, it is more difficult to intrude there into than into the web server 706.

Embodiment 4

A fourth embodiment of the present invention is an access controlling method in which the two network transportation ports are connected to different networks, respectively, and data is divided into two regions, and such a setting is carried out that it is possible to refer to and update the two data regions from the first network transportation port, and no access to the first data region is authorized and the second data region is authorized only to refer to from the second network transportation port.

Furthermore, this embodiment is the access controlling method in which the two network transportation ports are connected to the different networks, respectively, and data is divided into two regions, and such a setting is carried out that it is possible to refer to and update the two data regions from the first network transportation port, and no access to the first data region is authorized and the second data region is authorized to refer to and update from the second network transportation port.

As described above, according to the present invention, since the access to data is controlled based on information on a physical layout of the network, it is possible to increase the security of data as compared with a conventional security system.

Furthermore, the host computers are not authenticated one by one like the prior art; however, since all the host computers connected to the same network have the same authorization, and so the operation burden on administrator can be reduced.

Furthermore, because it is specified whether or not each I/O command is authorized at the second storage side, authorization can elaborately be set on data sharing. This prevents the data tampering or such like which has not been prevented.

What is claimed is:

1. A second storage comprising:
   a plurality of nonvolatile data storing means;
   a controller of the nonvolatile data storing means;
   an internal network for interconnecting the nonvolatile data storing means with the controller,
   wherein the controller includes a plurality of network transportation ports connected to different networks, respectively, an access controller for processing I/O commands requested for the transportation ports, and an access controlling table for storing access control setting information which defines the I/O commands that are to be authorized between each of the plurality of transportation ports and each of the plurality of nonvolatile data storing means; and a manager coupled to said controller for setting or changing said access control setting information, wherein the different types of I/O commands include READ and WRITE and the access control setting information includes READ only enable or READ and WRITE only enable information for each of the network transportation ports, said READ only or said READ and WRITE only information being changed by the manger, and wherein the controller controls to allow or deny access sent via the network based on said READ only or READ and WRITE only information.

2. A second storage according to claim 1, wherein the access controller judges authorization or rejection of the I/O commands requested for the transportation ports based on the access control setting information.

3. A second storage according to claim 1, wherein the access control setting information is set to the I/O commands to be authorized between a logical disk to be set to the plurality of nonvolatile data storing means and one of the plurality of transportation ports.

4. A second storage according to claim 1, comprising a management console for setting and changing the access control setting information.

5. A second storage according to claim 1, containing access control setting information which is set as readout unauthorized with respect to all the transportation ports.

6. A second storage according to claim 3, wherein the access controller reports the I/O command judged as unauthorized to the management console.

7. A second storage according to claim 5, wherein the management console comprises record means for recording the I/O commands reported from the access controller.

8. An access controlling method of a second storage, comprising:

a controller having a plurality of network ports connected to different networks, respectively, an access controller for processing I/O commands requested for the network ports, and an access controlling table for storing access control setting information which defines the I/O commands to be authorized between one of the plurality of network ports and one of the plurality of nonvolatile data storing means;

a plurality of nonvolatile data storing means;

an internal network for interconnecting the nonvolatile data storing means with the controller, wherein the access controller extracts an identifier of a data targeted by the I/O command from the I/O command received at the network port, confirms a nonvolatile data storing means to which the data will be read or stored, and the network port that received the I/O command, refers to the access controlling table, and judges whether or not the I/O command is authorized between the network port and the nonvolatile data storing means to which the data will be read or stored; and setting or changing said access control information, wherein the different types of I/O commands include READ and WRITE and the access control setting information includes READ only enable or READ and WRITE only enable information for each of the network transportation ports; and wherein said READ only or said READ and WRITE only information is changed and the controller controls to allow or deny access sent via the network based on said READ only or READ and WRITE only information.

9. An access controlling method according to claim 8, wherein when a frequency of judgment that access non-authorization to specific data stored in the nonvolatile data storing means exceeds a predetermined threshold, access from the plurality of transportation ports to the data is not authorized.

10. An access controlling method according to claim 8, wherein when a frequency of judgment that access non-authorization to specific data stored in the nonvolatile data storing means exceeds a predetermined threshold, an administrator of the second storage is notified that the judgment frequency of the access non-authorization exceeds a predetermined threshold.

11. An access controlling method according to claim 8, wherein when a system of the I/O commands is the SCSI (Small Computer System Interface) standards, a "CHECK CONDITION" status is transmitted as a report of abnormalities.

12. An access controlling method according to claim 11, wherein when a "REQUEST SENSE" request is issued after a host computer received the "CHECK CONDITION" status, a code denoting abnormalities is transmitted as a sense key and sense data in response thereto.

13. An access controlling method according to claim 12, wherein an "Illegal Request" is transmitted as the sense key.

14. An access controlling method according to claim 12, wherein "Data Protected" is transmitted as the sense key.

15. An access controlling method according to claim 8, wherein when a system of the I/O commands is NFS (Network File System), a NFS error code "NFSER-R_PERM" is transmitted as a report of the access non-authorization.

16. An access controlling method according to claim 8, wherein when a system of the I/O commands is NFS (Network File System), a NFS error code "NFSER-R_ACCS" is transmitted as a report of the access non-authorization.

17. A second storage comprising:

a plurality of nonvolatile data storing devices;

a controller of the nonvolatile data storing devices connected to each of the data storing devices;

said controller having a plurality of network transportation ports connected to different networks, respectively, an access controller for processing I/O commands of different types requested for the transportation ports, and an access controlling table for storing access control setting information for each of said network transportation ports that defines one of unauthorized access for the I/O commands or authorized access for at least one of the types of the I/O commands between each of the plurality of network transportation ports and each of the plurality of nonvolatile data storing devices, wherein said access controller judges the unauthorized access or the authorized access of the I/O commands requested for each of the transportation ports based on the access control setting information;

a manager coupled to said controller for setting or changing said access control information, wherein the different types of I/O commands include READ and WRITE and the access control setting information includes READ only enable or READ and WRITE only enable information for each of the network transportation ports; and said READ only or said READ and WRITE only information being changed by the manger and wherein the controller controls to allow or deny access sent via the network based on said READ only or READ and WRITE only information.

18. A second storage according to claim 17, further including a plurality of logical disks comprised of at least one of said data storing devices, wherein said access control setting information defines said one of the unauthorized access for the I/O commands or authorized access for at least one of the types of the I/O commands between each of the plurality of transportation ports and each of the plurality of the logical disks.

19. A second storage according to claim 17, further including a management console connected to said controller for setting and changing the access control setting information in the access controlling table for each of the network transportation ports.

* * * * *